United States Patent
Pelton

(10) Patent No.: US 6,705,054 B2
(45) Date of Patent: Mar. 16, 2004

(54) REUSABLE HURRICANE WINDOW GLASS FILM PROTECTION

(75) Inventor: Thomas Bradley Pelton, 10 Oakwood La., Homosassa, FL (US) 34446

(73) Assignee: Thomas Bradley Pelton, Homosassa Springs, FL (US)

(*) Notice: Subject to any disclaimer, the term of this patent is extended or adjusted under 35 U.S.C. 154(b) by 106 days.

(21) Appl. No.: 10/006,047

(22) Filed: Dec. 6, 2001

(65) Prior Publication Data

US 2003/0205024 A1 Nov. 6, 2003

(51) Int. Cl.$^7$ .................................................. E06B 3/28
(52) U.S. Cl. ....................... 52/203; 52/309.3; 52/309.16
(58) Field of Search .......................... 52/786.1, 786.11, 52/167.7, 167.9, 202, 203, 309.3, 309.16; 428/343, 40.1

(56) References Cited

U.S. PATENT DOCUMENTS

| | | | | |
|---|---|---|---|---|
| 4,312,903 A | * | 1/1982 | Molari, Jr. .................. 428/213 |
| 5,468,538 A | * | 11/1995 | Nameche .................... 428/101 |
| 5,506,051 A | * | 4/1996 | Levy-Borochov et al. .. 428/212 |
| 5,591,530 A | * | 1/1997 | Warner et al. .............. 428/480 |
| 5,916,391 A | * | 6/1999 | Riedel et al. ............... 428/480 |
| 6,004,670 A | * | 12/1999 | Kobe et al. ................. 428/343 |
| 6,106,982 A | * | 8/2000 | Mientus et al. ............... 430/14 |
| 6,124,044 A | * | 9/2000 | Swidler ...................... 427/154 |
| 6,147,165 A | * | 11/2000 | Lee et al. ................ 525/330.2 |
| 6,197,412 B1 | * | 3/2001 | Jambois ................... 428/297.4 |
| 6,316,120 B1 | * | 11/2001 | Emslander .................. 347/105 |

* cited by examiner

Primary Examiner—Carl D. Friedman
Assistant Examiner—Naoko Slack

(57) ABSTRACT

A hurricane resistant window vinyl film having visible light transmission and rip-stop, composed of a double layer of plastic film with a scrim laminated between the two pieces of plastic vinyl coated on one outside side with a pressure-sensitive adhesive that is reusable is then, applied to the inside of a window and it's frame. The near strength of the combination of plastic vinyl film, scrim and adhesive are balanced to provide buildings with protection from shattering glass.

3 Claims, 3 Drawing Sheets

REUSABLE HURRICANE WINDOW GLASS FILM PROTECTION

Reference claim priority to 60/251,946.

BACKGROUND OF THE INVENTION

This film relates to the protection of property and persons inside a building with glass windows, due to storm conditions.

There is a continuing problem with protecting yourself from storms by conventional means. Glass continues to get shattered, and wind gusts can still damage the structure. Most precautions of protecting one self from broken windows is either taping or boarding up the windows. Besides glass shattering everywhere, the gusts of wind entering through the hole can weaken the structure. Thus, the roof may blow off. If you board up your windows, you have to store the boards plus mechanically install them prior to the storm. Besides being unsightly, it takes more than one person to install. Clean up from taping is slow and messy. This invention is inexpensive and easy to use. It is a one step application after excess is cut away.

BRIEF SUMMARY OF THE INVENTION

Accordingly, it is a major object of the present invention to provide a window film, which helps to protect against broken windows.

Another object of the invention is to provide a quick and easy way of installation.

Another object of the invention is to emit light.

Another object of the invention is to provide a quick and easy cleanup of the film after use.

Another object of the invention is that it is reusable and inexpensive.

Further objects in advantages of the invention will be apparent from the following descriptions and the accompanying drawings.

In carrying out the invention, there may be provided a reinforced film including a paper backing. The film has rip-stop laminated in it, Removable Adhesive on one side of the film with a paper backing protecting the Removable Adhesive surface.

BRIEF DESCRIPTION OF THE DRAWINGS

In the accompanying drawings.

DETAILED DESCRIPTION

Figure 1:
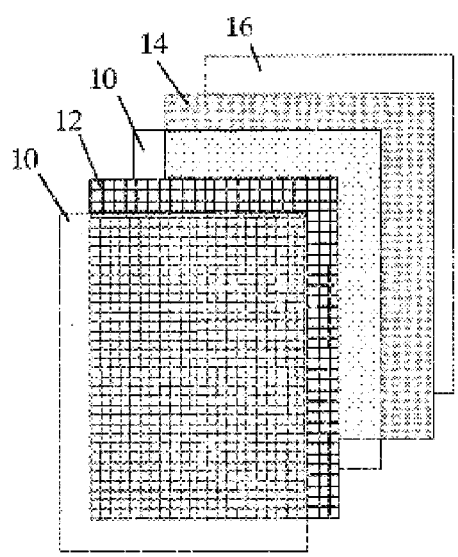
FIGS. 1, 2, 3, and 4 are respectively a frontal layer, front, side, and rear views which forms the film in accordance with the present invention.
Figure 2:
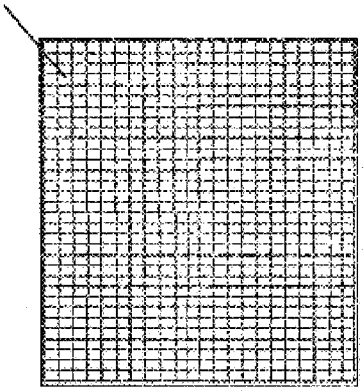
Figure 3:
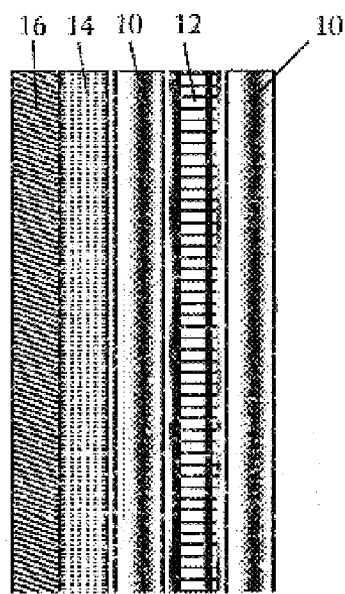
Figure 4:
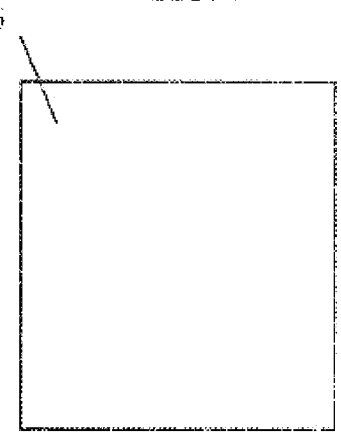
Figure 5:
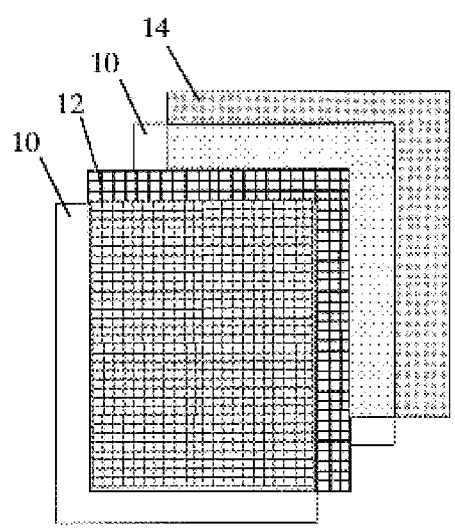
FIGS. 5, 6, 7, and 8 are respectively a frontal layer, front, side, and rear views which forms the film in accordance with the present invention.
Figure 6:
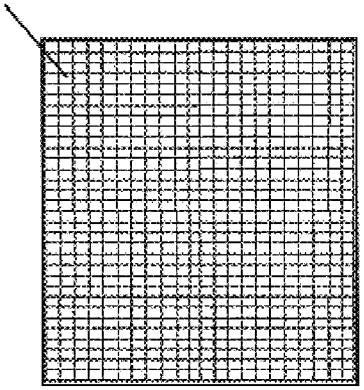
Figure 7:
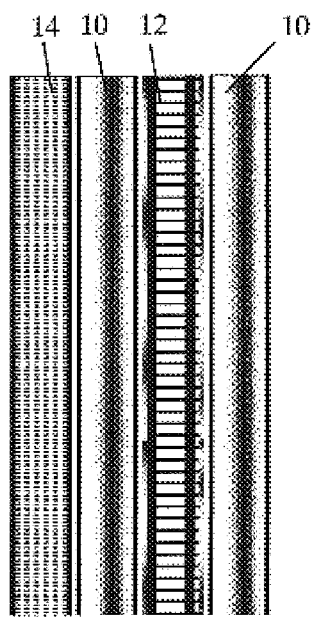
Figure 8:
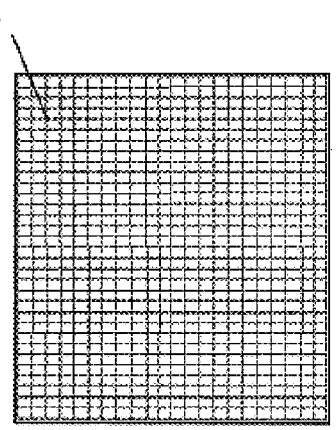

The preferred form of the invention shown in FIGS. 1 through 4 includes a paper backing member 16, as shown in FIGS. 1, 3, and 4 affixed to the Removable Adhesive side of the film member 14, as shown in the side view of FIG. 3. The device also includes two layers of Clear Vinyl member 10, with a rip stop member 12.

FIGS. 5 through 8 show the device without the paper-backing member 16. In this form the device includes two layers of Clear Vinyl member 10, with a rip stop member 12 and a Removable Adhesive member 14.

Figure 9:
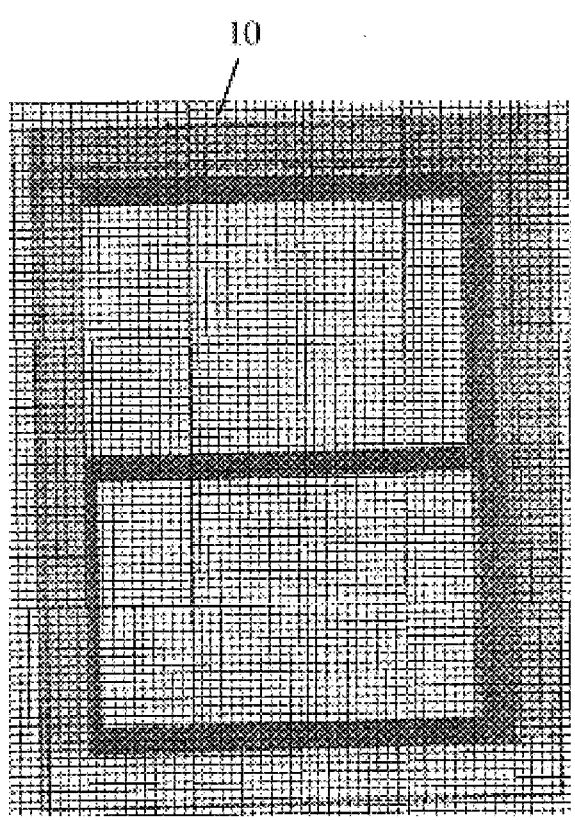
FIGS. 9 and 10 are respectively front and side views showing the film relationship of FIG. 6 in assembly relationship with window.
Figure 10:
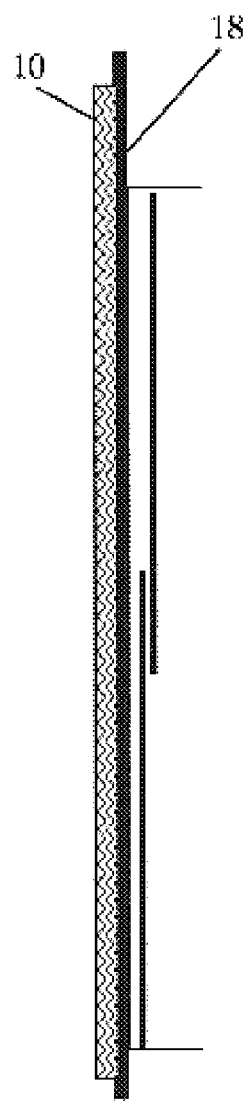

In FIGS. 5 through 8 shows that the device now can be adhered to a window FIGS. 9 and 10 by placing the device on the frame of the window with the Removable Adhesive member 14 against window member 18 and pressing over the device to insure contact. Trimming the device to size of the frame is not necessary.

What is claimed is:

1. A glass penetration resistant system for securing a pane of glass within a casing composing of:
    a penetration resistant sheet of flexible vinyl film, a sheet larger than the window pane and casing composed of two flexible plastic vinyl layers with rip-stop scrim laminated between the two layers of flexible plastic vinyl with a pressure-sensitive adhesive coated to one exterior layer of vinyl film, affixed to inside of a window system by a reusable pressure-sensitive tacky adhesive to keep intact the breach of broken glass if the pane breaks.

2. The penetration resistant sheet of vinyl film of claim 1, will not leave an adhesive mess on the window system after use.

3. The penetration resistant sheet of vinyl film of claim 2, has a reusable pressure-sensitive adhesive that has the ability to be rolled up and reused.

* * * * *